Feb. 10, 1953 J. M. LLOYD ET AL 2,628,307
EMERGENCY SIGNALING APPARATUS
Filed June 1, 1950 2 SHEETS—SHEET 1
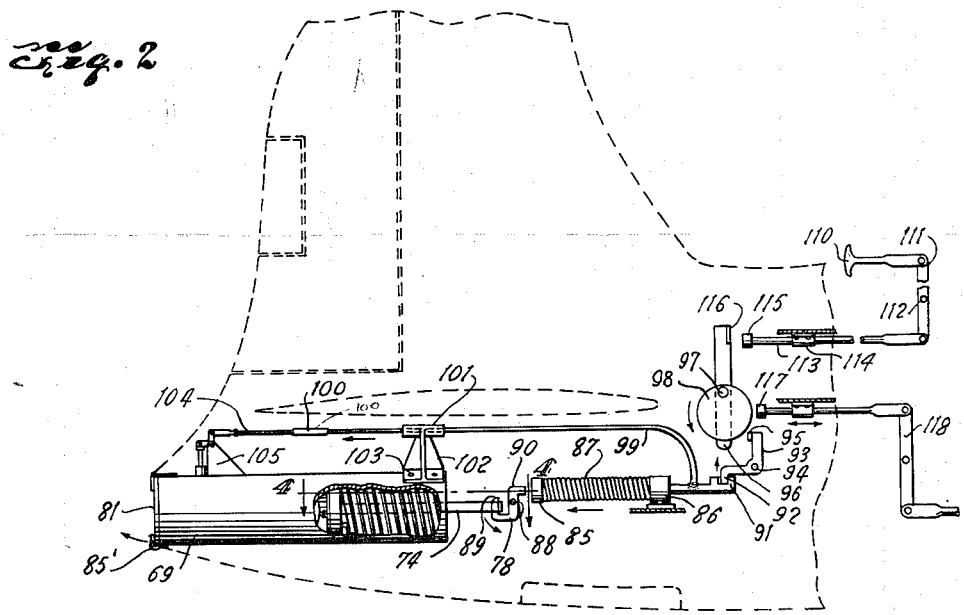
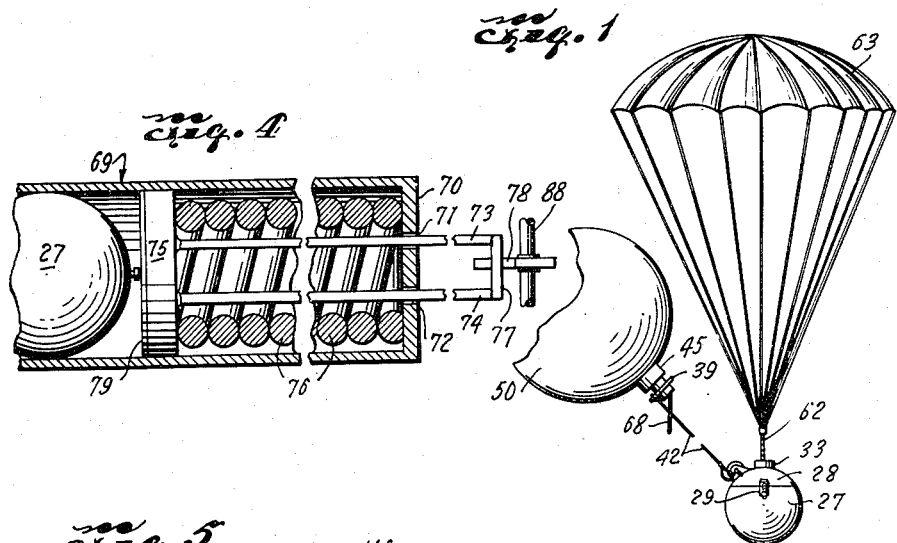
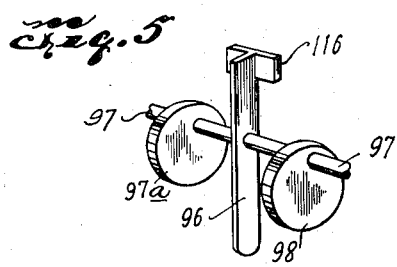
JACK M. LLOYD
WILEY M. WILLIAMSON
INVENTOR.
BY
ATTORNEY Feb. 10, 1953   J. M. LLOYD ET AL   2,628,307
EMERGENCY SIGNALING APPARATUS
Filed June 1, 1950   2 SHEETS—SHEET 2
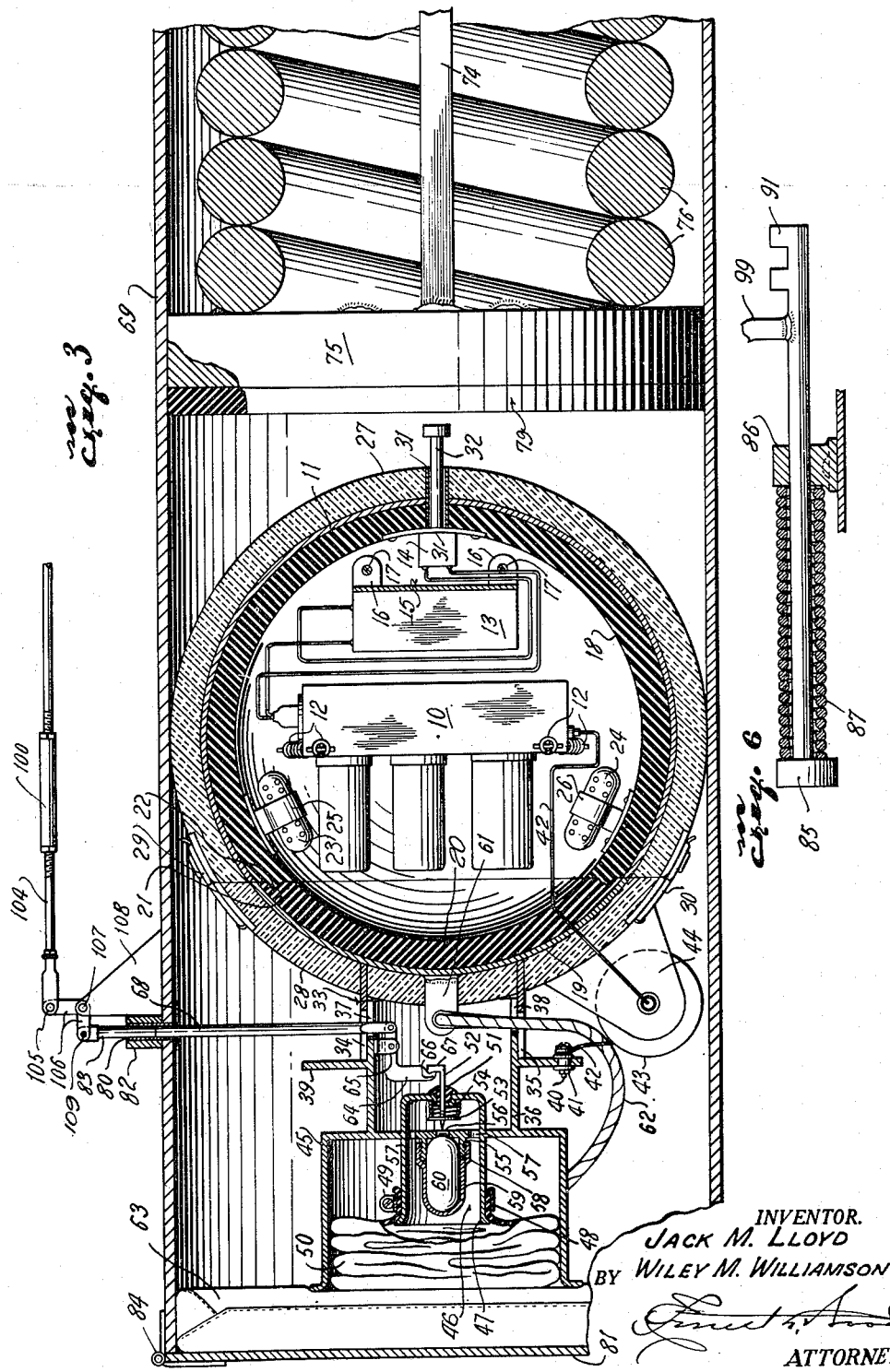
INVENTOR.
JACK M. LLOYD
BY WILEY M. WILLIAMSON
ATTORNEY Patented Feb. 10, 1953

2,628,307

UNITED STATES PATENT OFFICE 2,628,307

EMERGENCY SIGNALING APPARATUS

Jack M. Lloyd and Wiley M. Williamson, Driscoll, Tex.; said Lloyd assignor of one-twentieth to Eura Wilson and one-twentieth to Joe S. Ryan, both of Murfreesboro, Tenn.

Application June 1, 1950, Serial No. 165,486

4 Claims. (Cl. 250—17)

This invention relates to signaling devices and more particularly to such devices for indicating the location of an aircraft which crashed or made a forced landing.

Aircraft which are disabled and make forced landings or which crash are often difficult to find. Very often much time must be spent and great effort expended in finding the location of the disabled or crashed aircraft. This is particularly true when the plane lands or crashes at sea or in sparsely populated regions of earth. In order to facilitate the discovery of the location of such a disabled or crashed aircraft, it is desirable to provide a device which will automatically emit a location indicating signal when the aircraft crashes. The device should also be capable of being set in operation by the pilot of a disabled aircraft when a forced landing is about to be made.

Accordingly, it is an object of our invention to provide a new and improved signaling device for indicating the location of a disabled or crashed plane.

It is another object of our invention to provide a new and improved signaling device which is automatically set in operation when the aircraft equipped with the device crashes.

It is another object of our invention to provide a new and improved signaling device having a radio transmitter which is ejected from an aircraft and which is automatically set in operation upon being ejected from the aircraft.

It is still another object of our invention to provide a new and improved signaling device having a radii transmitter disposed in a barrel and an ejecting mechanism for propelling the transmitter from the barrel and simultaneously setting it in operation.

Briefly stated our new and improved signaling device for aircraft comprises a radio transmitter mounted in a hollow container which is adapted to be disposed in the barrel of an ejecting mechanism. The radio transmitter is provided with a parachute to decrease its rate of descent when it is ejected from the mechanism in mid-air and with a balloon which is supplied with a lighter than air gas when the transmitter is ejected. The antenna of the transmitter is attached to the balloon and is maintained in extended position by the balloon when the balloon is inflated by the gas. The ejecting mechanism may comprise a spring loaded piston which is normally maintained in retracted position by a latch. A pivotally mounted mass is mechanically linked to the latch to release the piston and eject the transmitter from the barrel when the forward motion of the aircraft is abruptly stopped by its collision with the ground, water or other obstructions in its path of flight. The mechanical linkage is also connected to a supply of lighter-than-air gas to release the gas into the balloon when the transmitter is ejected. The mechanical linkage is provided with a locking device to prevent accidental tripping of the latch and also with a hand or foot operated linkage extending to a control position in the aircraft to permit the piston to be released from the retracted position to eject the transmitter at the will of the pilot while the aircraft is in flight.

For a better understanding of our invention reference may be had to the following description taken in connection with the accompanying drawings and its scope will be pointed out in the appended claims.

Figure 1 is a front plan view, partly broken away, of the radio transmitter and its associated structures as they appear after ejection from an aircraft and while descending to the earth;

Figure 2 is a side view, with some parts partly broken away, of the signaling device as installed in an airplane;

Figure 3 is a longitudinal sectional view of the transmitter in the barrel of the ejecting mechanism;

Figure 4 is a longitudinal sectional view taken on line 4—4 of Figure 2;

Figure 5 is a perspective view of a portion of the device shown in Figure 2; and Figure 6 is a longitudinal sectional view of another portion of the device shown in Figure 2.

Referring now to Figure 3 of the drawing, a radio transmitter 10 of conventional design and which will continuously emit a predetermined signal, such as an S O S, when it is set in operation is mounted in a hollow shell 11 of comparatively great mechanical strength by means of spring mounts 12. Spring mounts 12 act as shock absorbers to prevent damage to transmitter 10 when the shell 10 is subjected to blows or relatively great accelerations. The transmitter 10 is connected to a source of power, such as a dry cell 13, through a switch 14. Dry cell 13 is rigidly secured to a plate 15 which is secured to shell 11 by means of ears 16 and screws 17. The inner surface of shell 11 is lined with a shock absorbing pad 18 of resilient material such as rubber. The opening in shell 11 is closed by a cover 19 which also is lined with a shock absorbing pad 20. Pad 20 is provided with an annular groove 21 in which is received the raised bead 22 of pad 18. Groove 21 and bead 22 cooperate to maintain a liquidtight seal and protect transmitter 10 from moisture. Apertured containers 23 and 24 are secured to pad 18 by brackets 25 and 26, respectively, and contain a moisture absorbing substance to maintain dry the air about transmitter 10 and protect it against corrosion.

Shell 11 and cover 19 are covered with members 27 and 28, respectively, which are made of a heat insulating material. Any conventional means, such as latches 29 and 30, may be employed to rigidly secure members 27 and 28 to one another. It will be noted that the shell 11 and cover 19, and their internal and other protective members, form a sphere. This shape is preferred since it provides a construction having a comparatively great mechanical strength. Pad 18, shell 11, and member 27 are provided with registering apertures through which extends a sleeve 31 and a plunger 32 connected to switch 14. Switch 14 is mounted to pad 18 and shell 11 by means of a plate 31' which compresses the pad 18 adjacent sleeve 31 and forms a liquidtight seal to prevent water from entering the chamber in which is disposed transmitter 10. Plunger 32, when pushed into switch 14, connects transmitter 10 to dry cell 13.

Cover 19 is provided with a cylindrical sleeve 33 which is secured to cover 19 by welding or any other conventional means. Sleeve 33 is provided with a pair of slots 34 and 35 and is adapted to receive the free end of a cylindrical housing 36 which is provided with slots 37 and 38 which register with slots 34 and 35, respectively. Sleeve 36 is provided intermediate its ends with an outwardly extending flange 39 against which bears the free end of sleeve 33. Flange 39 is provided with an antenna securing means such as the bolt 40 and nut 41. The antenna 42 extends through suitable apertures in pad 20, cover 19, and member 28 and is wound on a reel 43 which is rotatably mounted on a support 44 secured to cover 19.

Secured to sleeve 36 is a balloon retaining receptacle 45 provided at its center with a cylindrical housing 46 having a flared open end 47 on which is secured, by means of a clamp 48 tightened by the usual screw 49, the neck of a balloon 50. The other end of housing 46 is provided with an aperture in which is secured a seal 51 of rubber or other resilient material. Extending through the seal 51 is a needle 52 having a portion of its shaft adjacent the pointed end threaded to secure an interiorly threaded annular member 53. After needle 52 is inserted through seal 51, the spring 54 is placed about needle 51 and annular member 53 is then screwed on the shaft of needle 52. Seal 51 prevents the passage of air or gas between needle 52 and housing 46.

After spring 54 and needle 52 have been assembled on housing 46, a plate 55 is rigidly secured in housing 46 by any suitable means, such as welding. Plate 55 is provided with a central aperture 56 and peripheral slots 57. Plate 55 is also provided with an exteriorly threaded flange 58 which engages the interiorly threaded end of a gas cartridge retaining member 59. The gas cartridge 60 is securely held by member 59 against plate 55. The needle 52 is adapted to pass through central aperture 56 and pierce the cartridge 60 which contains a lighter-than-air gas under pressure. The gas escaping from cartridge 60 passes through aperture 56 and through the slots 57 into the balloon 50.

A lug 61 is secured to cover 19 by welding or other suitable means and has secured to it a cord or rope 62 which passes through the registering slots 38 and 35 and extends to a parachute 63 to which it is secured. A bell crank 64 is pivotally secured to sleeve 36 by means of a lug 65 attached to the inner surface of sleeve 36 adjacent slot 37 by welding or other suitable securing means. The notched end 66 of bell crank 64 is adapted to engage the spur 67 on one end of needle 52 and maintain the pointed end of needle 52 in a position remote from cartridge 60 against the force of spring 54. A push rod 68 is pivotally secured to the other end of bell crank 64 and extends through registering slots 37 and 34.

Radio transmitter 10, balloon 50, and parachute 63 and their associated structures are contained in a barrel 69 rigidly mounted in an aircraft, such as the airplane indicated by broken lines in Figure 2. Barrel 69 has a closed end 70 as shown in Figure 4, provided with apertures 71 and 72 through which pass rods 73 and 74, respectively, whose inner ends are secured to a piston 75 by welding or other suitable means. A powerful spring 76 is interposed between end 70 and piston 75 and urges piston 75 away from end 70 of barrel 69. The outwardly extending rods 73 and 74 are jointed by a cross-piece 77 which is secured to rods 73 and 74 by welding or other suitable means after piston 75 and spring 76 are assembled in barrel 69 and rods 73 and 74 are passed through apertures 71 and 72. Cross-piece 77 prevents the piston 75 and spring 76 from separating completely from barrel 69 after cross-piece 77 is released by the bell crank 78.

The radio transmitter 10 is disposed immediately adjacent the retracted piston 75 in barrel 69, the member 27 being of such dimension as to fit snugly within barrel 69, the fit being tight enough to prevent movement of member 27 toward piston 75. The plunger 32 extends toward a resilient pad 79 secured to piston 75 and is pushed toward switch 14 when piston 75 is released and moves under the force of spring 76 away from end 70 of barrel 69. The push rod 68 extends into a bearing 80 which extends through an aperture in barrel 69 adjacent the lid 81 and through a sleeve 82 secured to barrel 69 by welding or any other suitable means. The friction between bearing 80 and push rod 68 is sufficient to maintain it in the position illustrated in Figure 3 until the plunger 83 pushes rod 68 into barrel 69. Care is taken during the positioning of sleeve 36 in barrel 69 to maintain the bell crank lever 64 and needle 52 in the position shown to prevent puncture of cartridge 60.

Parachute 63 is placed in barrel 69 immediately after balloon retaining receptacle 45 and abuts receptacle 45 and the lid 81. Lid 81 is secured to barrel 69 by means of a hinge 84 and is kept in closed position by a catch 85' which may be a spring or of frangible material and which will permit lid 81 to move pivotally about hinge 82 when piston 75 is released to eject the contents of the barrel 69.

In order to cause bell crank 78 to release cross-piece 77 and allow piston 76 to move toward lid 81 to eject transmitter 10 from barrel 69 when the airplane in which the barrel is rigidly secured crashes, we provide a spring loaded plunger which slides through an aperture in a supporting member 86 rigidly secured to the plane, as shown in Figure 6. A spring 87 bears on member 86 and plunger 85 and biases plunger 85 toward one end of bell crank 78 which is pivotally mounted on a rod 88 rigidly mounted in the plane. The end 89 of bell crank 78 engages cross-piece 77 and retains piston 75 in its retracted position until plunger 85 hits the end 90 and causes bell crank 78 to pivot. The opposite end of plunger 85 is provided with a spur 91 which is engaged by the end 92 of a bell crank 93 to maintain plunger 85 in its retracted position. Bell crank 93 is pivotally mounted, as at 94, on the plane structure and has an end provided with a striker plate 95 adapted to be engaged by a bar 96. Bar 96 is rigidly mounted on a shaft 97 rotatably mounted on the plane structure. Also rigidly mounted on opposite sides of bar 96 are masses 97a and 98 which cause shaft 97 to rotate counter-clockwise, Figure 2, when the forward motion of the plane is abruptly halted. When shaft 97 is so caused to rotate, the lower end of bar 96 strikes plate 95 of bell crank 93, causing it to rotate to disengage its end 92 from spur 91. The plunger 85 then moves toward bell crank 98 due to the action of spring 87 and hits the end 90 sharply causing bell crank 78 to rotate counterclockwise, Figure 2, about shaft 88. This counter-clockwise rotation of bell crank 78 causes end 89 of bell crank 78 to disengage from crosspiece 77 thus allowing piston 75 to eject parachute 63, balloon 50 and transmitter 10 from barrel 69. Spring loaded plunger 85 is employed since the relatively great force exerted by the strong spring 76 would not permit the disengagement of cross-piece 77 from bell crank 78 if the bar 96 were to be coupled directly to bell crank 78 if masses 97a and 98 of the same weight were employed. Use of plunger 85 enables use of masses 97a and 97 of smaller weight.

In order to puncture the cartridge 60 simultaneously with the release of piston 75, we provide a linkage between plunger 85 and plunger 83 which comprises a rod 99 (Fig. 2) which has one end rigidly secured to plunger 85 by welding or any other suitable means and its other end threaded to engage a turnbuckle 100. Rod 99 passes through a supporting bearing 101 mounted on barrel 69 by means of a bracket 102. Bracket 102 is secured to barrel 69 by any conventional means, such as screws 103. Also, having a threaded end engaging turnbuckle 100 is a rod 104 whose other end is pivotally secured at 105 to a bell crank 106. Bell crank 96 is pivotally mounted at 107 on a bracket 108 which in turn is mounted on barrel 69 by welding or any other suitable means. Pivotally secured, as at 109, to bell crank 106 (Fig. 3) is the plunger 83 which is pushed toward barrel 69 when bell crank 106 is pivoted in a counter-clockwise manner about the point 106. The turnbuckle 100 is employed to adjust the length of stroke of plunger 83 to insure that push rod 68 will be pushed into barrel 69 and clear bearing 80 while plunger 83 will not enter into barrel 69. Otherwise, the inner end of plunger 83 would interfere with the outward movement of transmitter 10.

It will be apparent that when plunger 85 is released, push rod 68 will be moved inwardly to pivot bell crank 64 in a clockwise direction and release needle 52 which will move under the urging of spring 53 toward cartridge 60 to puncture cartridge 60. The gas in cartridge 60 will then escape and begin to inflate balloon 50 which will be simultaneously ejected from barrel 69. If the cause of release of piston 75 was the crash of the plane, parachute 63 will probably not function. Transmitter 10, parachute 63, and balloon 50 will be thrown clear of the wreckage by piston 75. As balloon 50 inflates it will tend to rise and will unreel antenna 42 from reel 43. The antenna will be extended and transmitter 10 will broadcast the predetermined signal since it will have been connected to dry cell 13 by switch 14 by the action of piston 75 on plunger 32. The rubber pad 79 (Fig. 4) is employed to cushion the initial shock of impact of piston 75 on transmitter 10. This catch 84, if it is a spring, will bend away from lid 81 and allow it to open due to the force exerted on it by lid 81 due to the action of spring 76 on piston 75. If of frangible material, catch 84 will break off when piston 75 is released.

The pilot of a disabled plane may release the piston 75 as he descends to make his forced landing by pushing a lever 110 which is secured to one end 111 of a lever pivotally secured at 112 to the plane structure. The other end of lever 110 is pivotally secured to one end of a rod 113 which slides in bracket 114 rigidly secured to the plane structure. The end 115 of rod 113 strikes a plate 116 mounted on bar 93 and causes counterclockwise rotation of shaft 97, and release of plunger 85 and piston 75. In this case, parachute 63 will slow down the rate of descent of transmitter 10 to prevent damage when it strikes the ground or sea.

In order to insure that usual shocks such as occur during normal landings will not actuate the piston 75, we provide a locking rod 117 (Fig. 2) which is actuated by a mechanical linkage indicated generally by the numeral 118. The linkage 118 may be connected to a handle or pedal located within reach of the pilot or copilot so that when a normal landing is to be made the pilot may lock bar 96 to prevent its counterclockwise rotation, Figure 2.

Transmitter 10 may be mounted in a shell 11 and member 27 of such size and weights as will enable it to float on the water. In addition the lifting force exerted by balloon 50 will tend to maintain transmitter 10 afloat.

It will be noted that barrel 69 has been mounted in the tail of the plane to eject the transmitter 10 rearwardly. This position is preferred since the tail is less likely to be damaged in a crash than other portions of a plane. However, the barrel 69 could be mounted in other locations in the plane if it were so desired. While we have provided a spring 76 to provide the force to eject transmitter 10 from barrel 69, other means can be employed for this purpose. For example a cartridge filled with an explosive substance could be employed to propel piston 75 toward the open end of barrel 69.

Spring mounts 12 and pads 18 and 20 protect the radio transmitter 10 from the shocks occasioned by the release of piston 12 and also from the shocks caused by the dropping of the transmitter to the ground. While the parachute and balloon will decrease the rate of descent of the transmitter 10 when it is ejected from an aircraft in flight, the parachute may not open when the transmitter is ejected due to the crash of the aircraft. In the latter case, the transmitter may have such a small distance to fall after ejection that it will reach the ground before the parachute has time to open. The rate of descent in either case is likely to be comparatively slow and what shock does occur will be absorbed by shock mounts 12 and pads 18 and 20.

The signalling device disclosed may be employed to mark the location of other disabled aircraft, shipwrecks, survivors of crashed aircraft or shipwrecks, and other objects where the aircraft provided with the signalling device cannot remain over the location due to lack of fuel or other reasons. The transmitter will be ejected by use of lever 119 and will continue to emit a signal in the vicinity of the location. The signal in all can be detected by use of conventional receivers and the exact location can be plotted by determining the direction from which the signal is emanating in the well known manner.

While we have illustrated and described a preferred embodiment of our invention, it will be apparent that various changes and modifications can be made without departing from our invention and we, therefore, aim in the appended claims to cover all such changes and modifications as fall within the true spirit and scope of our invention.

What is claimed is:

1. In an aircraft: a barrel; a transmitter for continuously emitting a predetermined signal; a parachute connected to said transmitter; a balloon; an antenna connected between said balloon and said transmitter; means for inflating said balloon with gas, said transmitter, parachute, balloon, antenna and inflating means being disposed in said barrel; a spring loaded piston in said barrel for ejecting said transmitter, parachute and balloon from said barrel; a first latch holding said piston in retracted position; a spring loaded plunger for striking said latch to release said piston from retracted position; a second latch holding said plunger in retracted position; and a mass pivotally mounted in said aircraft for movement with respect to said aircraft upon violent deceleration of the aircraft, said mass striking said second latch upon such pivotal movement to release said plunger from actuated position.

2. The device of claim 1, and a linkage operable from a control position in said aircraft for selectively pivotally moving said mass to strike said latch to release said plunger from said retracted position.

3. The device of claim 2, and a locking linkage operable from a control position, said locking linkage including a locking rod operatively associated with said mass for preventing pivotal movement of said mass toward said second latch when moved by said locking linkage to locking position.

4. The device of claim 1 and a linkage connected to said plunger and operatively associated with said inflating means for initiation of operation of said inflating means upon release of said plunger from retracted position.

JACK M. LLOYD.
WILEY M. WILLIAMSON.

REFERENCES CITED

The following references are of record in the file of this patent:

UNITED STATES PATENTS

| Number | Name | Date |
|---|---|---|
| 1,755,389 | Clark et al. | Apr. 22, 1930 |
| 2,328,208 | Friedman | Aug. 31, 1943 |
| 2,402,143 | Arenstein | June 18, 1946 |
| 2,470,783 | Mead | May 24, 1949 |
| 2,473,050 | Camp | June 14, 1949 |
| 2,500,809 | Fennessey et al. | Mar. 14, 1950 |
| 2,519,553 | Faulkner | Aug. 22, 1950 |